Patented Nov. 1, 1932

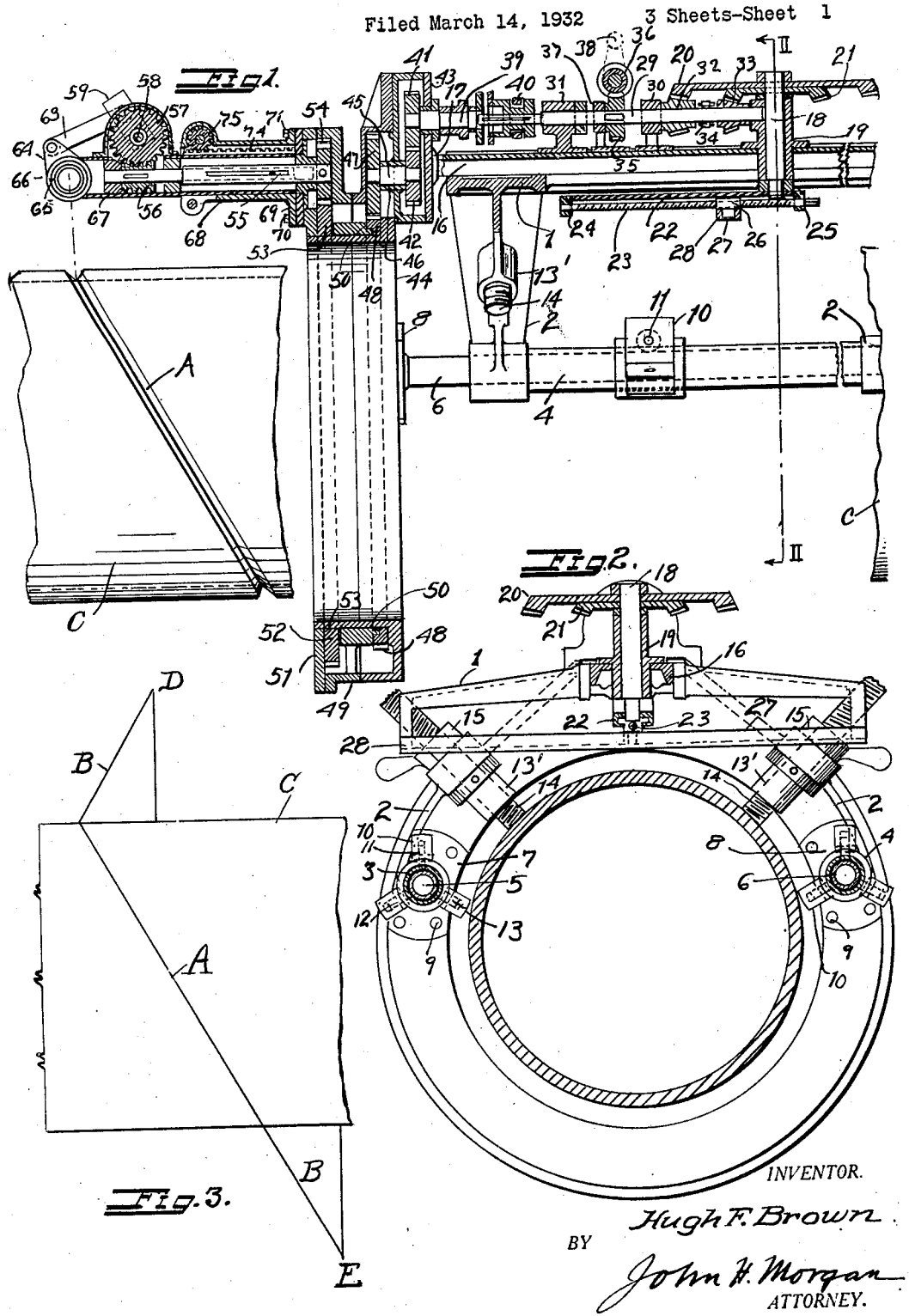

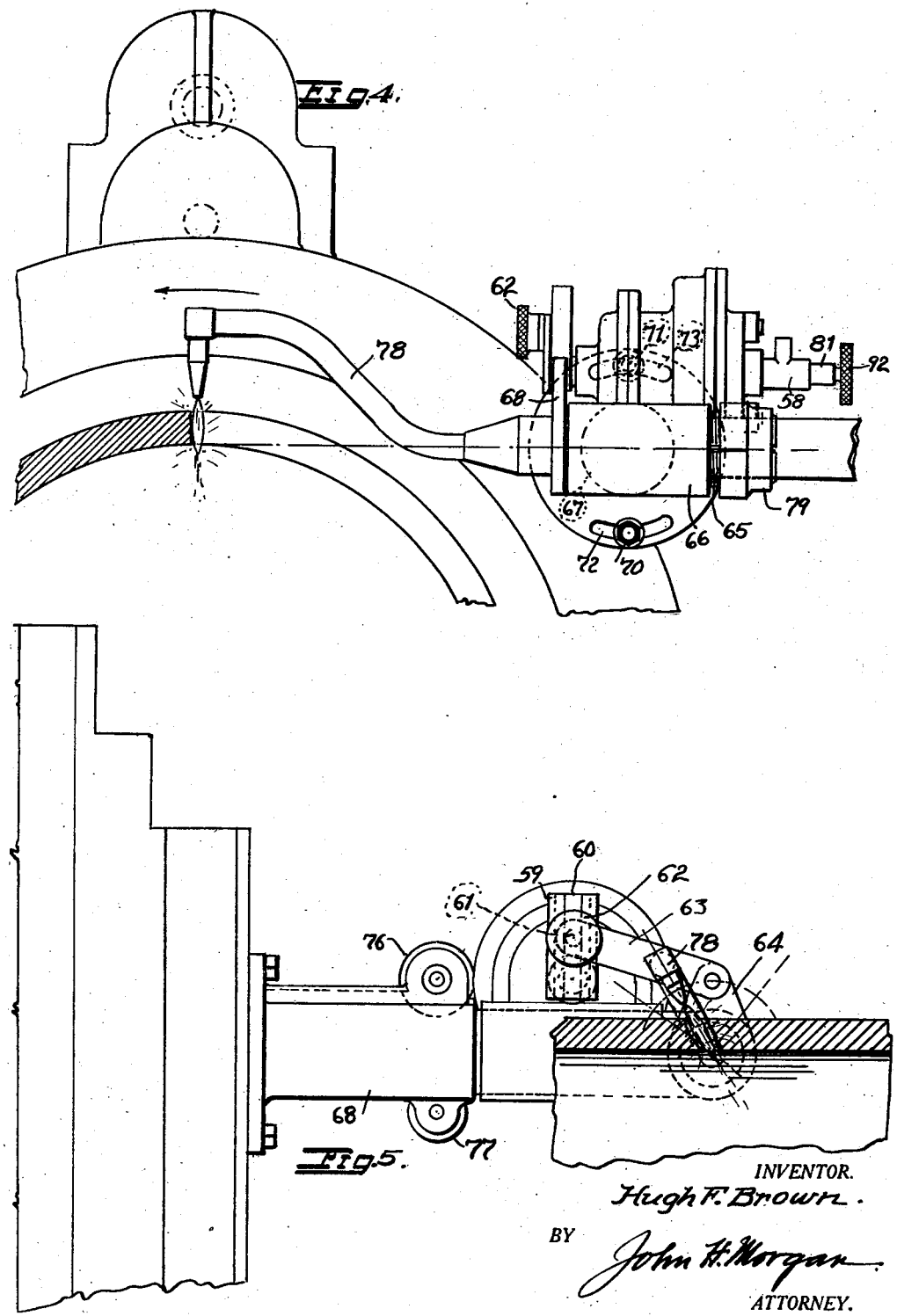

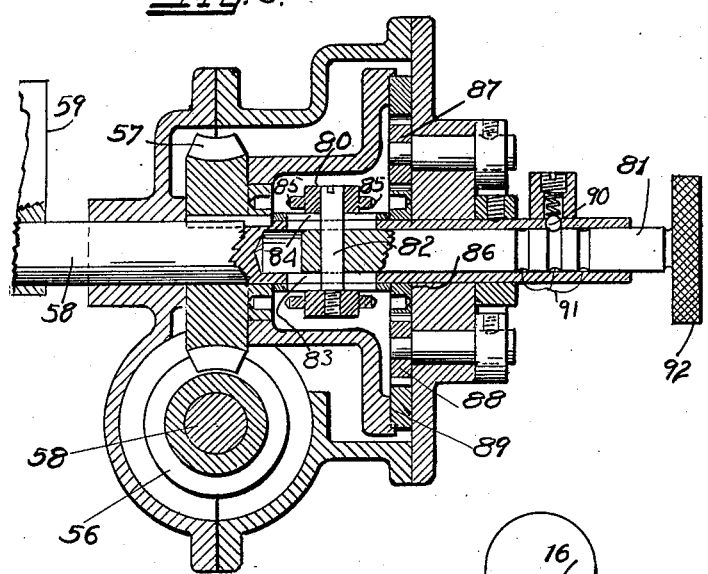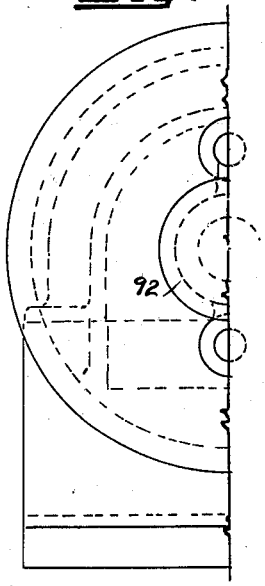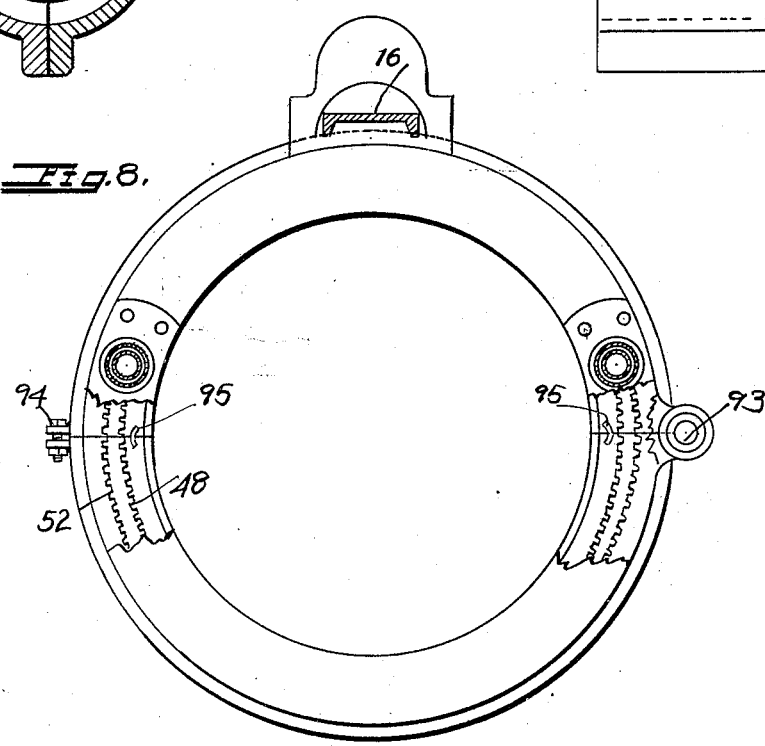

1,885,107

UNITED STATES PATENT OFFICE

HUGH F. BROWN, OF SAN FRANCISCO, CALIFORNIA, ASSIGNOR TO BROWN BROTHERS WELDING COMPANY, OF SAN FRANCISCO, CALIFORNIA, A COPARTNERSHIP COMPOSED OF HUGH F. BROWN AND WILLIAM P. BROWN

PIPE CUTTING MACHINE

Application filed March 14, 1932. Serial No. 598,644.

This invention relates to pipe cutting machines, and more particularly to the means for holding a cutting torch on the machine at different angles to the pipe, and means for automatically changing the angle of the torch as the cut is being made.

This application is an improvement on my application filed Aug. 12, 1931, pipe cutting machine, Ser. No. 556,603.

It is understood by those skilled in the art of pipe welding that the ends of the meeting pipes must have beveled edges so as to form a V-shaped groove which can be filled with weld metal as the weld is made.

In cutting off pipe at an angle the torch must be set at an angle to the angle of the cut in order to bevel the edge, but this set angle will be found to equal or nearly equal the angle of the cut at the opposite side of the pipe; so, in order to maintain an angle to the cut the angle of the torch must be changed gradually as the torch is carried around the pipe, and among the objects of this invention is to provide means for automatically changing the angle of the torch as it is carried around the pipe in making a cut at an angle, so that the bevel angle will be maintained all around the pipe and thus provide an even bevel edge whereby the meeting of the pipe ends will form a V shaped groove of even depth and shape.

Another object is to provide means to change the ratio of travel of the torch longitudinally to its revolutions around the pipe, and to change the angle of the torch as it revolves around the pipe.

Another object is to improve the construction of the machine in the means to carry the ring housing, in providing antifriction bearings for the sliding parts, to provide suitable clutches for changing the different ratios of gearing, and for disconnecting the main drive means from the ring drive mechanism, and to improve the means of driving the machine.

Another object is to provide means to place the ring housing, ring, and gearing over the pipe to be cut without the necessity of placing it over the end of the pipe line.

Other objects will appear to those skilled in this art as the description progresses.

An embodiment of the invention is shown in the accompanying drawings, in which the same reference numeral is applied to the same portion throughout the several views and of which there may be modifications.

Figure 1 is a sectional view of the machine, some parts being broken away, and showing a pipe in which the cut is made.

Figure 2 is a section on line 2—2 of Figure 1.

Figure 3 is a diagram illustrating the angle of cut and angle of torch.

Figure 4 is a front view of a portion of the machine showing a torch and torch holding means on a somewhat larger scale.

Figure 5 is a view looking from the left of Figure 4 showing a pipe portion in section.

Figure 6 is a sectional view of the torch holding angle changing means and change gears.

Figure 7 is an end view broken away looking from the left of Figure 6.

Figure 8 is a view of a modified form of ring housing showing parts broken away.

The numeral 1 indicates the frame of the machine which has bearing-brackets 2 to support pipes 3 and 4 in which slides the ring housing supporting members 5 and 6 which are attached to the ring housing by the flanges 7 and 8 and rivets 9. Antifriction means are shown by the bracket 10 in which are mounted the rollers 11—12 and 13 on which the members 5 and 6 roll.

Two or more of these brackets are provided, generally four. Four bearings 13' are provided for the supporting and adjusting screw rods 14 and threaded nuts 15; two of these bearings only are shown in this instance.

Mounted in the frame is the slide member 16, attached to a gear housing at 17.

Mounted on the slide is the vertical shaft 18 by means of the bearing bracket 19; the upper end of the shaft has the bevel gears 20 and 21, secured thereto, and the lower end has the crank arm 22 fixed thereon. The crank arm has the screw 23 supported by bearings at 24 and 25 in the arm.

A nut 26 has the depending pin 27 which is adapted to slide in the cross channel 28 fixed to the frame of the machine so that the turning of the screw rod 23 moves the nut and pin, and thus changes the length of the crank by changing the crank pin. On the upper side of the slide is mounted the horizontal shaft 29 in the brackets 30 and 31, bevel pinions 32 and 33 are loosely mounted on the shaft, 32 being in mesh with the large bevel gear 20, and 33 in mesh with the small bevel gear 21, a clutch 34 connects either of the pinions to the shaft to turn therewith.

The driving means consists of the worm wheel 35, and worm 36 mounted in the bearing bracket 37 on the slide 16. A handle 38 is provided to turn the worm. In practice the worm and handle may be set at any convenient angle.

A short shaft 39 is in line with the shaft 29, and is adapted to be engaged or disengaged by a suitable clutch 40, preferably a friction clutch; on the end of shaft 39 is the spur gear 41 in mesh with the spur gear 42 in the gear housing 43 which is a part of the ring housing 44. A short shaft 45 has a bearing in the housing at 46, and on one end is fixed the gear 42, and on the other end is fixed the gear 47 in mesh with the ring driving gear 48 and drives the torch carrying ring 49 by means of the connection at 50; a cover ring 51 is on the rotatable ring. A ring gear 52 is fixed to the stationary portion of the housing at 53 and has the spur gear pinion 54 in mesh therewith. This pinion is fixed on the shaft 55, and operates to change the angle of the cutting torch holder through the worm 56 and worm gear 57. The gear 57 is fixed to the shaft 58 on which is mounted the crank arm 59; this arm has a slot 60 in which a pin 61 is adapted to slide and be held in adjusted positions by a nut 62; a link 63 connects the crank arm to a crank member 64 fixed to the torch holder tube 65 which is rotatable in the tube 66 mounted at right angles to the tube 67 which is adapted to slide in the tubular member 68 which includes the flange 69 which is bolted to the rotatable ring member by the bolts 70 and 71; slots 72 and 73 are provided so the torch holder may be turned to adjust the cutting tip in relation to the pipe to be cut. For adjusting the distance of the torch from the housing, a toothed rack 74 is fixed on the tube 67, and a pinion 75 is journaled in the tube 68, and is provided with thumb knob 76. A clamp screw 77 is provided to hold the tube in the adjusted position.

The cutting torch is indicated at 78, the body of which is clamped in the holder by the nut 79; the center line of the holder intersects the tangent of the inside diameter of the pipe to be cut so that the tip of the cutting frame will turn about that point, as shown in Figures 4 and 5.

In making a cut like that shown in Fig. 1 at A, the crank arms 22 and 59 make one turn to one turn of the torch, but any ratio can be had by small changes; Figures 6 and 7 show means for changing from a one to one to two to one ratio, and it consists of a slidable clutch 80 on the shaft 58 which is operated by the slidable pin 81 in the end of the shaft, a pin 82 connects the two members of the clutch and slides in the slots 83, clutch teeth 85 engage openings in the worm wheel 57 and the gear 86 both of which are loosely mounted on the shaft 58. Pinions 87 and 88 are in mesh with the gear 86 and also in mesh with an internal gear ring 89. The clutch is held in the different positions by the spring pressed ball in the grooves 91. A knob is provided to operate the clutch.

In the modified form of housing ring shown in Fig. 8, the housing is made in two parts and hinged at 93 and is clamped together at 94 by bolt or other suitable means. Gear 52 is stationary and gear 48 rotates with the rotatable housing; as the gears and housings are all cut in half it is only necessary to line up the rotatable housing with the stationary housing so the cuts are in line to open the housing and place it over the pipe to be cut, the gear rings automatically line up. A curved key is inserted at 95 to provide additional means for lining up the gears.

In operation the ring housing is adjusted concentric with a pipe to be cut by the screws 14 then the torch is set in position as shown in Figures 4 and 5 by the knob 76, the bolts 70 and 71 tightened, the proper ratio gears thrown in, then clutch 40 is thrown in, the torch gas supply adjusted, and the ring housing turned one complete revolution by the crank 38.

The diagram in Fig. 3 illustrates why it is necessary to change the angle of the torch represented by the line B, to make the cut on the angle A of the pipe C. It will be noted that in position D the angle is right for a bevel cut, but in position E the torch is in line with the cut without any angle.

Having thus described my invention what I desire to secure by Letters Patent of the United States is as follows, but modifications may be had in carrying out the invention as shown in the accompanying drawings and particularly described form thereof, within the purview of the annexed claims:

I claim:

1. A pipe cutting machine of the class described comprising a frame adapted to be mounted on a pipe to be cut, a rotatable ring concentric to the pipe, a cutting torch on said ring, means to drive the ring to carry the torch completely around the pipe in one direction, means to hold the torch at an angle to the pipe, and means to change the angle of said torch progressively and automatically as it is carried around the pipe, to cut it off at any desired angle.

2. A pipe cutting machine of the class described comprising a frame adapted to be mounted on a pipe to be cut, a rotatable ring concentric to the pipe, a cutting torch on said ring, means to drive the ring to carry the torch completely around the pipe in one direction, means to hold the torch at an angle to cut a bevel edge on said pipe, and means to progressively and automatically change the angle of said torch to maintain an even bevel as the torch is carried around the pipe, to cut it off at any desired angle.

3. A pipe cutting machine of the class described comprising a frame adapted to be mounted on a pipe to be cut, a rotatable ring concentric to the pipe, a cutting torch on said ring, means to drive the ring to carry the torch completely around the pipe in one direction, means to set the torch at different angles, means to move the torch longitudinally of said pipe as it is carried around the pipe and automatic means to change the angle of said torch progressively as it travels around the pipe.

4. A pipe cutting machine of the class described comprising a frame adapted to be mounted on a pipe to be cut, a rotatable ring concentric to the pipe, a cutting torch on said ring, means to drive the ring to carry the torch completely around the pipe in one direction, means to set the torch in different positions and angles in relation to the pipe, means to move the torch longitudinally of the pipe, and means to progressively and automatically change the angle of the torch to cut an even angle as the torch is carried around the pipe, to cut it off at any angle.

5. A pipe cutting machine of the class described comprising a frame adapted to be mounted on a pipe to be cut, a rotatable ring concentric to the pipe, a cutting torch on said ring, means to drive the ring to carry the torch completely around the pipe in one direction, means to automatically move the torch longitudinally as the torch travels around the pipe, means to set the torch to make a bevel cut, and automatic means to change the angle of said torch progressively as it is carried around the pipe to maintain an equal bevel on said cut as the pipe is cut off at any angle.

6. A pipe cutting machine of the class described comprising a frame, a slidable member in said frame, a ring housing on said slidable member, a ring in said housing, a cutting torch on said ring, guide rods fixed to said housing, antifriction bearings for said rods in said frame, means to drive said ring, means to set said torch at different angles, and automatic means for changing the angle of said torch as said ring is rotated.

7. A pipe cutting machine of the class described comprising a frame, a slidable member in said frame, a ring housing on said slidable member, a rotatable ring on said housing, a cutting torch on said ring, a torch holder on said ring for said torch, means to rotate the torch in the holder, means rendering the holder rotatable on the ring, and automatic means to rotate the torch holder and torch as said ring is rotated.

8. A pipe cutting machine of the class described comprising a frame, a slidable member in said frame, a ring housing fixed to said slidable member, a rotatable ring on said housing, a cutting torch holder on said ring, a torch for said holder, a crank arm having an adjustable pin, a cross bar guide for said pin on said frame, changeable driving means for said crank arm, means to oscillate said holder and torch, means to rotate said ring as said crank arm rotates, and said holder and torch oscillates.

9. A pipe cutting machine of the class described comprising a frame, means to mount said frame concentric to a pipe to be cut, two or more sliding members in said frame, a ring housing carried by said slidable members, a rotatable ring on said housing, a ring gear fixed to said rotatable ring, pinions for driving said gear, a shaft having a clutch connection adapted to drive said pinions, means to drive said shaft, bevel pinions on said shaft, adapted to mesh with bevel gears of different ratios, a shaft driving said bevel gears, a clutch for said bevel pinions, a crank arm on said bevel gear shaft, an adjustable pin on said crank arm, a cross bar guide for said pin on said frame, means to drive said pinions and gears, a stationary ring gear in said housing, a shaft having a pinion in mesh with said stationary gear mounted on said rotatable ring, a cutting torch holder fixed to said shaft bearing, a worm on said shaft, a worm wheel in mesh with said worm, an adjustable crank on said worm shaft, a crank on said torch holder, a connecting link between the last mentioned crank and said adjustable crank whereby said torch holder is given an oscillating movement as the ring carries the torch around the pipe.

10. A pipe cutting machine of the class described comprising a frame, a slidable member in said frame, a housing on said member in two parts, a hinge for said parts, a fastening means for said parts, a rotatable ring in two parts in said housing, a ring gear fixed to said rotatable ring in two parts, a stationary ring fixed to said housing, said stationary ring being in two parts, whereby the alignment of the joints of said parts and housing will permit the opening thereof on said hinge.

11. A pipe cutting machine of the class described comprising a frame, slidable members in said frame, a housing on said members, a rotatable ring on said housing, a torch holder on said ring, means to oscillate said torch holder in geared ratio to the revolutions of said rotatable ring, and means to change said ratio.

12. A pipe cutting machine of the class described comprising a frame adapted to be mounted on a pipe to be cut, slidable members in said frame, a ring housing concentric to the pipe fixed to said slidable members, an adjustable crank arm on one of said slidable members, changeable means for driving said crank arm whereby the slidable members are given a to and fro movement, a rotatable ring in said housing, means to rotate said ring in geared ratio to the movement of said crank arm, means to change said ratio, a cutting torch on said rotatable ring, a holder for said torch, means to oscillate said holder in geared relation to the rotation of said rotatable ring, and means to change said geared relation.

13. A pipe cutting machine of the class described comprising a torch holder having an extension drive shaft, means to drive the shaft, a worm on said shaft, a worm wheel in mesh with said worm, a tubular housing for said shaft, a projecting shaft driven by said worm, a slotted crank arm on said shaft, a housing for said worm wheel, an internal gear ring in said housing, pinions in mesh with said gear and a pinion on said shaft, sliding clutch adapted to engage said worm wheel or said shaft pinion to change the speed of said shaft, a tubular holder for said torch fixed at right angles to said tubular housing, a crank on said holder, a link connecting said crank with said slotted crank whereby the rotation of said worm wheel will impart an oscillating motion to said holder.

14. A pipe cutting machine of the class described comprising a frame, a ring housing having slidable supports in said frame, a rotatable ring mounted on said housing, means to move said housing to and fro, means to change the travel of said housing, means to drive said rotatable ring, a torch holder on said rotatable ring, means to clamp a torch in said holder, means to set the torch for making a straight cut on a pipe, and means to automatically change the angle of the torch and holder when making an angle cut on a pipe.

HUGH F. BROWN.